United States Patent
Lee et al.

(10) Patent No.: US 9,299,497 B2
(45) Date of Patent: Mar. 29, 2016

(54) MULTILAYER CERAMIC CAPACITOR AND BOARD FOR MOUNTING THE SAME

(71) Applicant: SAMSUNG ELECTRO-MECHANICS CO., LTD., Suwon, Gyunggi-do (KR)

(72) Inventors: Byoung Hwa Lee, Gyunggi-do (KR); Heung Kil Park, Gyunggi-do (KR); Min Cheol Park, Gyunggi-do (KR); Young Ghyu Ahn, Gyunggi-do (KR); Sang Soo Park, Gyunggi-do (KR); Tae Hyeok Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 431 days.

(21) Appl. No.: 13/764,301

(22) Filed: Feb. 11, 2013

(65) Prior Publication Data
US 2014/0168849 A1    Jun. 19, 2014

(30) Foreign Application Priority Data

Dec. 14, 2012  (KR) .................. 10-2012-0146584

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/012* (2013.01); *H01G 4/12* (2013.01); *H01G 4/232* (2013.01); *H01G 2/065* (2013.01)

(58) Field of Classification Search
CPC ......................................................... H01G 4/30
USPC ................................................ 361/303, 301.4
See application file for complete search history.

(56) References Cited

U.S. PATENT DOCUMENTS

2004/0240146 A1   12/2004   Kayatani et al.
2006/0158827 A1    7/2006   Lee et al.
(Continued)

FOREIGN PATENT DOCUMENTS

JP    05-074644 A    3/1993
JP    06-215978 A    8/1994
(Continued)

OTHER PUBLICATIONS

Japanese Office Action issued in correspondsing Japanese Application No. 2013-022103, dated May 27, 2014, with English translation.
(Continued)

*Primary Examiner* — Eric Thomas
(74) *Attorney, Agent, or Firm* — McDermott Will & Emery LLP

(57) ABSTRACT

There is provided a multilayer ceramic capacitor including: a ceramic body; an active layer including a plurality of first and second internal electrodes formed to be alternately exposed to both end surfaces of the ceramic body, disposed vertically on upper and lower surfaces of the ceramic body and forming capacitance; an upper cover layer formed upwardly of the active layer; a lower cover layer formed downwardly of the active layer and having a thickness greater than that of the upper cover layer; and first and second external electrodes covering both end surfaces of the ceramic body, wherein the active layer includes a first block in which a first region I and a second region II formed, and a second block in which a third region III, and a fourth region IV formed.

16 Claims, 7 Drawing Sheets

(51) Int. Cl.
  *H01G 4/012* (2006.01)
  *H01G 4/12* (2006.01)
  *H01G 4/232* (2006.01)
  *H01G 2/06* (2006.01)

(56) References Cited

U.S. PATENT DOCUMENTS

| | | | |
|---|---|---|---|
| 2008/0080121 A1 | 4/2008 | Togashi | |
| 2012/0152604 A1 | 6/2012 | Ahn et al. | |
| 2012/0300361 A1* | 11/2012 | Togashi | 361/301.4 |
| 2013/0038979 A1* | 2/2013 | Togashi | H01G 4/30 361/301.4 |

FOREIGN PATENT DOCUMENTS

| | | |
|---|---|---|
| JP | 08-130160 A | 5/1996 |
| JP | 2004-022859 A | 1/2004 |
| JP | 2006-203165 A | 8/2006 |
| JP | 2008-091520 A | 4/2008 |
| JP | 2012-104784 A | 5/2012 |
| JP | 2013-206966 A | 10/2013 |
| TW | I234791 B | 6/2005 |
| TW | 2012-34397 A | 8/2012 |

OTHER PUBLICATIONS

Taiwanese Examination Report issued in corresponding Taiwanese Patent Application No. 102103897; 5 pages with English translation.

Office Action Japanese Patent Application No. 2013-022103 dated Nov. 26, 2013 with English language Abstract.

Office Action Korean Patent Application No. 10-2012-0146584 dated Feb. 4, 2014 with English translation.

\* cited by examiner

MULTILAYER CERAMIC CAPACITOR AND BOARD FOR MOUNTING THE SAME

CROSS-REFERENCE TO RELATED APPLICATIONS

This application claims the priority of Korean Patent Application No. 10-2012-0146584 filed on Dec. 14, 2012, in the Korean Intellectual Property Office, the disclosure of which is incorporated herein by reference.

BACKGROUND OF THE INVENTION

1. Field of the Invention

The present invention relates to a multilayer ceramic capacitor and a structure for mounting a circuit board of a multilayer ceramic capacitor.

2. Description of the Related Art

A multilayer ceramic capacitor, a laminated chip electronic component, is a chip-type condenser installed on a printed circuit board (PCB) of various electronic products such as imaging devices (or video display apparatuses) such as liquid crystal displays (LCDs), plasma display panels (PDPs), and the like, computers, smart phones, portable phones, and the like, serving to charge and discharge electricity.

A multilayer ceramic capacitor (MLCC), having advantages such as compactness, guaranteed high capacity, and ease of mountability, may be used as a component of various electronic devices.

The MLCC may include a plurality of dielectric layers and internal electrodes, having a structure in which internal electrodes having different polarities are alternately laminated between the dielectric layers.

The dielectric layers have piezoelectric and electrostrictive properties. Thus, when a direct current (DC) or alternating current (AC) voltage is applied to an MLCC, a piezoelectric phenomenon occurs between internal electrodes, generating vibrations.

Vibrations may be transferred to a PCB on which the MLCC is mounted, through solders of the MLCC, inducing the entirety of the PCB to become an acoustic surface radiating vibrating sound as noise.

Vibrating sound may correspond to audio frequencies ranging from 20 Hz to 2000 Hz, making users uncomfortable, and such a vibrating sound causing discomfort for users is known as acoustic noise.

In order to reduce acoustic noise, a product in which a thickness of a lower cover layer of an MLCC is increased has been studied.

Also, an MLCC having an increased thickness lower cover layer is mounted as a horizontal mounting type MLCC such that the thick lower cover layer is positioned at the bottom thereof on a printed circuit board (PCB) to advantageously reduce acoustic noise.

Meanwhile, research into reducing acoustic noise in the case that the MLCC having the increased thickness lower cover layer is mounted on a PCB is further required.

RELATED ART DOCUMENT (Patent document 1) Japanese Patent Laid Open Publication No. 2006-203165

SUMMARY OF THE INVENTION

An aspect of the present invention provides a multilayer ceramic capacitor (MLCC) and a board for allowing an MLCC to be mounted thereon.

According to an aspect of the present invention, there is provided a multilayer ceramic capacitor including: a ceramic body in which a plurality of dielectric layers are laminated; an active layer including a plurality of first and second internal electrodes formed to be alternately exposed to both end surfaces of the ceramic body with the dielectric layer interposed therebetween, disposed vertically on upper and lower surfaces of the ceramic body and forming capacitance; an upper cover layer formed upwardly of the active layer; a lower cover layer formed downwardly of the active layer and having a thickness greater than that of the upper cover layer; and first and second external electrodes covering both end surfaces of the ceramic body, wherein the active layer includes a first block in which a first region I formed to one side based on a central portion R of the ceramic body in the length direction in the length-width (L-W) cross-section of the ceramic body and including internal electrodes having different polarities facing one another in a lamination direction to form capacitance and a second region II including internal electrodes having the same polarity disposed in the lamination direction so as to not form capacitance, and a second block in which a third region III formed on the other side based on the central portion R of the ceramic body in the length direction, facing the first region I in the length direction of the ceramic body, and including internal electrodes having the same polarity facing one another in the lamination direction so as to not form capacitance, and a fourth region IV facing the second region II in the length direction of the ceramic body and including internal electrodes having different polarities facing one another in the lamination direction to form capacitance.

In the central portion R of the ceramic body in the length direction, internal electrodes having different polarities may face one another in the lamination direction to form capacitance.

A plurality of first blocks and a plurality of second blocks may be alternately laminated.

When it is defined that half of the overall thickness of the ceramic body is A, a thickness of the lower cover layer is B, half of overall thickness of the active layer is C, a thickness of the upper cover layer is D, (B+C)/A may satisfy $1.063 \leq (B+C)/A \leq 1.745$.

When it is defined that the thickness of the lower cover layer is B and the thickness of the upper cover layer is D, a ratio (D/B or D:B) between the thickness D of the upper cover layer and the thickness B of the lower cover layer may satisfy a range of $0.021 \leq D/B \leq 0.422$.

When it is defined that half of the overall thickness of the ceramic body is A and the thickness of the lower cover layer is B, a ratio (B/A) of the thickness B of the lower cover layer to half A of the thickness of the ceramic body may satisfy a range of $0.329 \leq B/A \leq 1.522$.

When it is defined that the thickness of the lower cover layer is B and half of the overall thickness of the active layer is C, a ratio (C/B) of the half C of the thickness of the active layer to the thickness B of the lower cover layer may satisfy a range of $0.146 \leq C/B \leq 2.458$.

Due to a difference between strain generated in the central portion of the active layer and that generated in the lower cover layer during the application of voltage, a point of inflection (PI) formed in both end portions of the ceramic body may be formed below the central portion of the ceramic body in the thickness direction.

According to another aspect of the present invention, there is provided a board for allowing a multilayer ceramic capacitor (MLCC) to be mounted thereon, including: a printed circuit board having first and second electrode pads formed upwardly thereof; and an MLCC installed on the PCB, wherein the MLCC includes a ceramic body in which a plurality of dielectric layers are laminated, an active layer including a plurality of first and second internal electrodes formed to be alternately exposed to both end surfaces of the ceramic body with the dielectric layer interposed therebetween, disposed vertically on upper and lower surfaces of the ceramic body and forming capacitance, an upper cover layer formed upwardly of the active layer, a lower cover layer formed downwardly of the active layer and having a thickness greater than that of the upper cover layer, and first and second external electrodes formed on both end surfaces of the ceramic body and connected to the first and second electrode pads by solders, wherein the active layer includes a first block in which a first region I formed to one side based on a central portion R of the ceramic body in the length direction in the length-width (L-W) cross-section of the ceramic body and including internal electrodes having different polarities facing one another in a lamination direction to form capacitance and a second region II including internal electrodes having the same polarity disposed in the lamination direction so as to not form capacitance, and a second block in which a third region III formed on the other side based on the central portion R of the ceramic body in the length direction, facing the first region I in the length direction of the ceramic body, and including internal electrodes having the same polarity facing one another in the lamination direction so as to not form capacitance, and a fourth region IV facing the second region II in the length direction of the ceramic body and including internal electrodes having different polarities facing one another in the lamination direction to form capacitance.

In the central portion R of the ceramic body in the length direction, internal electrodes having different polarities may face one another in the lamination direction to form capacitance.

A plurality of first blocks and a plurality of second blocks may be alternately laminated.

When it is defined that half of the overall thickness of the ceramic body is A, a thickness of the lower cover layer is B, half of overall thickness of the active layer is C, a thickness of the upper cover layer is D, (B+C)/A may satisfy $1.063 \leq (B+C)/A \leq 1.745$.

When it is defined that the thickness of the lower cover layer is B and the thickness of the upper cover layer is D, a ratio (D/B or D:B) between the thickness D of the upper cover layer and the thickness B of the lower cover layer may satisfy a range of $0.021 \leq D/B \leq 0.422$.

When it is defined that half of the overall thickness of the ceramic body is A and the thickness of the lower cover layer is B, a ratio (B/A) of the thickness B of the lower cover layer to half A of the thickness of the ceramic body may satisfy a range of $0.329 \leq B/A \leq 1.522$.

When it is defined that the thickness of the lower cover layer is B and half of the overall thickness of the active layer is C, a ratio (C/B) of the half C of the thickness of the active layer to the thickness B of the lower cover layer may satisfy a range of $0.146 \leq C/B \leq 2.458$.

Due to a difference between strain generated in the central portion of the active layer and that generated in the lower cover layer during the application of voltage, a point of inflection (PI) formed in both end portions of the ceramic body may be formed below the central portion of the ceramic body in the thickness direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
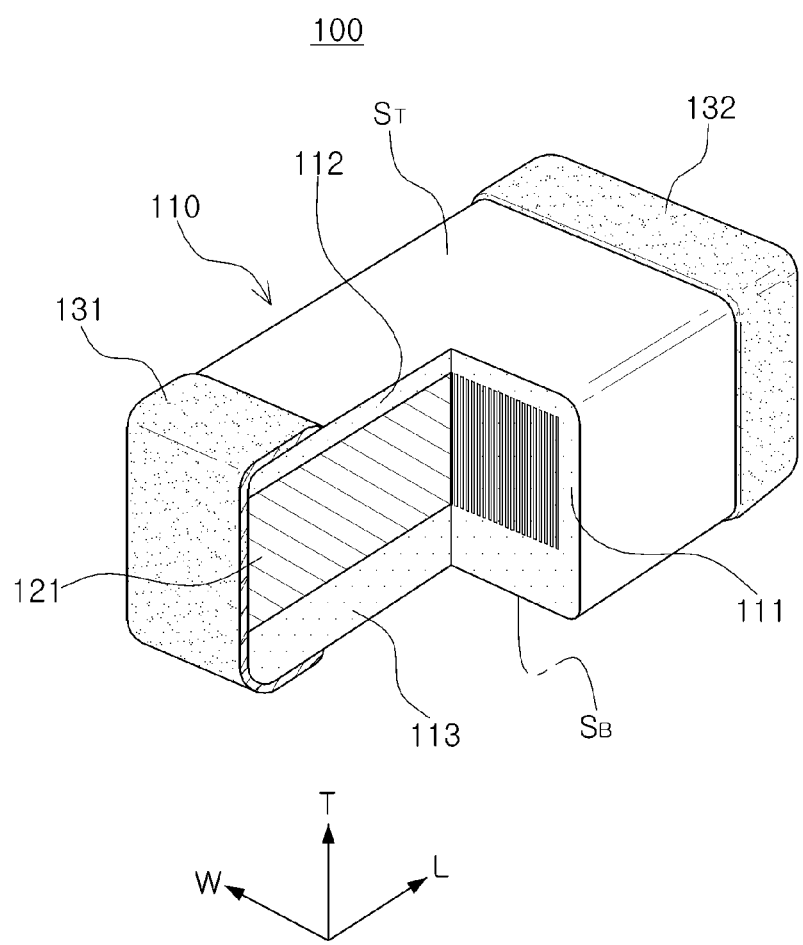
FIG. 1 is a schematic partially cutaway perspective view of a multilayer ceramic capacitor (MLCC) according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals.

In order to clarify embodiments of the present invention, directions of the hexahedron may be defined as follows: L, W, and T indicated in FIG. 1 denote a length direction, a width direction, and a thickness direction, respectively. Here, the thickness direction may be used to have the same concept as that of a lamination direction in which the dielectric layers are laminated.

Also, in the present embodiment, for the purposes of description, surfaces on which first and second external electrodes are formed in a length direction of the ceramic body are set as horizontal end surfaces and surfaces perpendicular thereto are set as left and right lateral surfaces.

Also, an upper surface of the ceramic body on which an upper cover layer is formed is referred to as $S_T$, and a lower surface thereof on which a lower cover layer is formed is referred to as $S_B$.

Embodiments of the present invention will be described with reference to the accompanying drawings.

FIG. 1 is a schematic partially cutaway perspective view of a multilayer ceramic capacitor (MLCC) according to an embodiment of the present invention.

Figure 2:
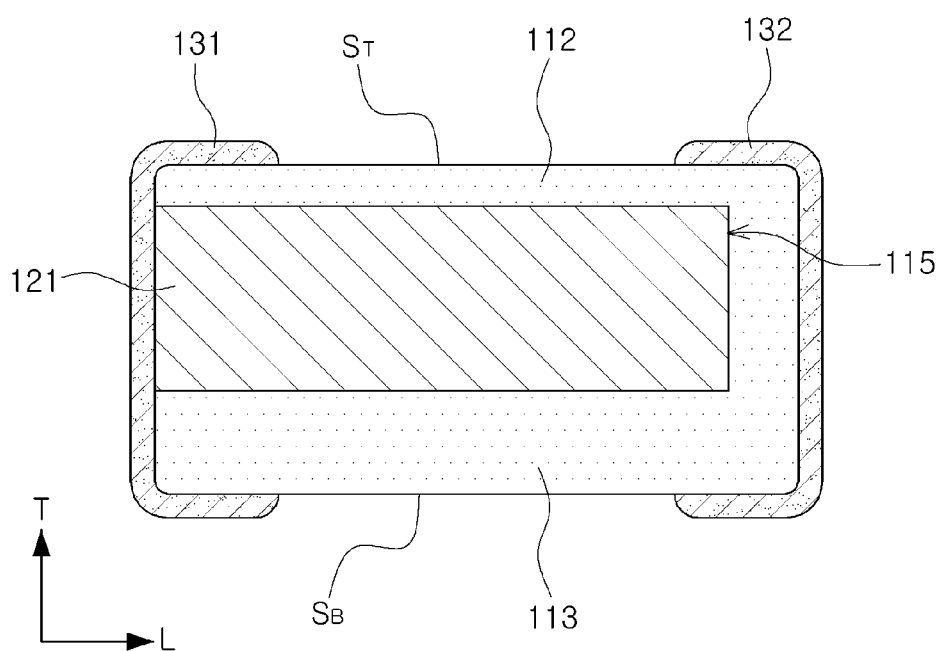
FIG. 2 is a cross-sectional view of the MLCC of FIG. 1 taken in a length-thickness direction.

FIG. 2 is a cross-sectional view of the MLCC of FIG. 1 taken in a length-thickness direction.

Figure 3:
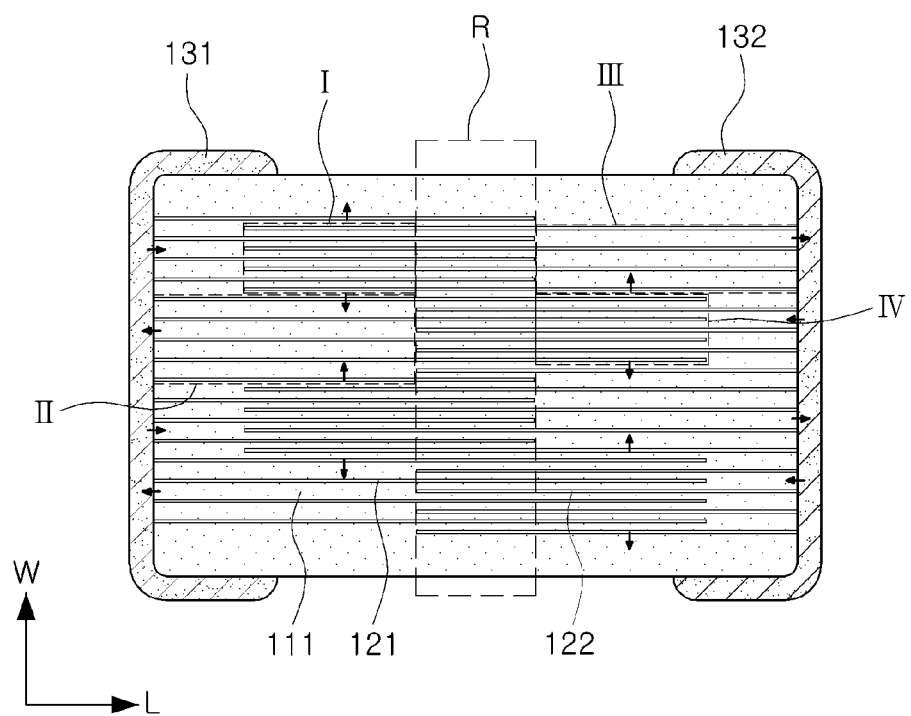
FIG. 3 is a cross-sectional view of the MLCC of FIG. 1 taken in a length-width direction.

FIG. 3 is a cross-sectional view of the MLCC of FIG. 1 taken in a length-width direction.

Figure 4:
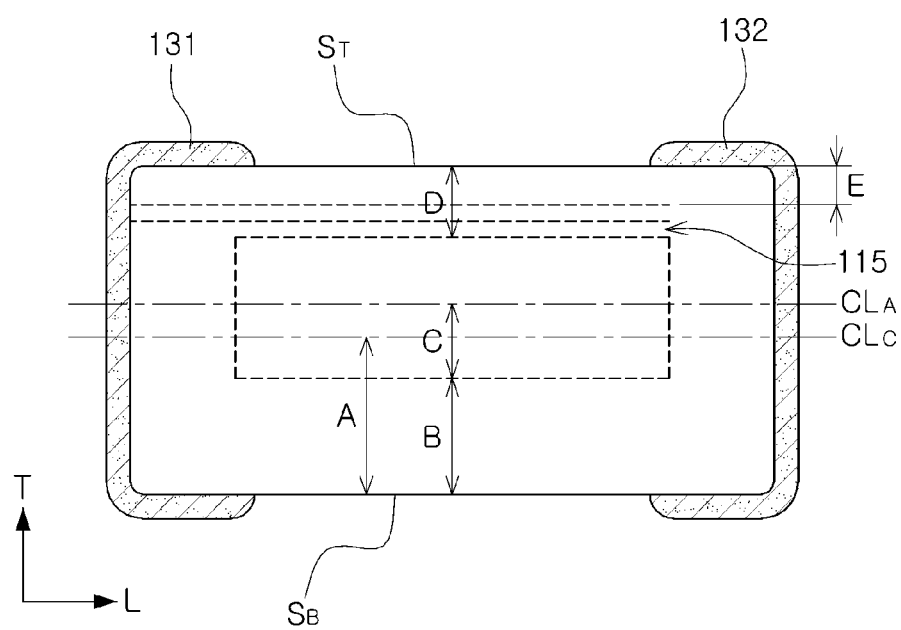
FIG. 4 is a schematic cross-sectional view of the MLCC of FIG. 1 taken in a length direction to show dimension relations of components included in the MLCC.

FIG. 4 is a schematic cross-sectional view of the MLCC of FIG. 1 taken in a length direction to show dimension relations of components included in the MLCC.

Referring to FIGS. 1 through 3, an MLCC 100 according to an embodiment of the present invention may include a ceramic body 110, an active layer 115 having first and second internal electrodes 121 and 122, upper and lower cover layers 112 and 113, and first and second external electrodes 131 and 132 covering both end surfaces of the ceramic body 110.

The ceramic body 110 is formed by laminating a plurality of dielectric layers 111 and subsequently firing the same, and a configuration and dimensions of the ceramic body 110 and a lamination amount of the dielectric layers 111 are not limited to those illustrated in the present embodiment.

Also, the plurality of dielectric layers 111 forming the ceramic body 110 are in a sintered state and adjacent dielectric layers 50 may be integrated such that boundaries therebetween may not be readily apparent without the use of a scanning electron microscope (SEM).

The ceramic body 110 may include the active layer 115 as a portion contributing to formation of capacitance of the capacitor and upper and lower layers 112 and 113, as margin portions, formed on upper and lower portions of the active layer 115.

The active layer 115 may be formed by iteratively laminating the first and second internal electrodes 121 and 122 with the dielectric layer 115 interposed therebetween, and the plurality of first and second external electrodes 131 and 132 may be disposed vertically on upper and lower surfaces of the ceramic body 110.

Here, a thickness of the dielectric layer 111 may be arbitrarily changed according to design of capacitance of the MLCC 100. Preferably, a thickness of one dielectric layer 111 may range from 0.1 µm to 10.0 µm after a firing operation, but the present invention is not limited thereto.

Also, the dielectric layer 111 may be made of ceramic powder having high dielectric constant (or high K-dielectrics), e.g., a barium titanate ($BaTiO_3$)-based powder, a strontium titanate ($SrTiO_3$)-based powder, but the present invention is not limited thereto.

The upper and lower cover layers 112 and 123 may be made of the same material and have the same configuration as those of the dielectric layer 111, except that they do not include an internal electrode.

The upper and lower cover layers 112 and 123 may be formed by laminating a single dielectric layer or two or more dielectric layers on upper and lower surfaces of the active layer 115, and basically serve to prevent damage to the first and second internal electrodes 121 and 122 due to physical or chemical stress.

Also, the lower cover layer 113 may have a thickness greater than that of the upper cover layer 112, by increasing a lamination amount of the dielectric layers to be greater than that of the upper cover layer 112.

Meanwhile, the first and second internal electrodes 121 and 122, a pair of electrodes having different polarities, may be formed by printing a conductive paste including a conductive metal to have a predetermined thickness.

Also, the first and second internal electrodes 121 and 122 may be alternately exposed to both end surfaces in a lamination direction of the dielectric layers 111, and may be electrically insulated from one another by the dielectric layer 111 disposed therebetween.

Namely, the first and second internal electrodes 121 and 122 may be electrically connected to the first and second external electrodes 131 and 132 through portions thereof alternately exposed to both end surfaces of the ceramic body 110.

Thus, during the application of voltage to the first and second external electrodes 131 and 132, charges are accumulated between the mutually facing first and second internal electrodes 121 and 122 and, here, capacitance of the MLCC 100 is proportional to an area of a mutually overlap region of the first and second internal electrodes 121 and 122.

Also, the first and second external electrodes 131 and 132 may be disposed vertically on the upper and lower surfaces of the ceramic body 110.

Thus, as described hereinafter, when the MLCC is mounted on a printed circuit board (PCB), acoustic noise can be reduced.

A thickness of the first and second internal electrodes may be determined according to purposes. For example, a thickness of the first and second internal electrodes may be determined to range from 0.2 µm to 1.0 µm, but the present invention is not limited thereto.

Also, a conductive metal included in the conductive paste forming the first and second internal electrodes 121 and 122 may be nickel (Ni), copper (Cu), palladium (Pd), or an alloy thereof, but the present invention is not limited thereto.

Also, the conductive paste may be printed by using a screening method, a gravure printing method, or the like, but the present invention is not limited thereto.

Meanwhile, the first and second external electrodes 131 and 132 may be made of a conductive paste including a conductive metal, and the conductive metal may be nickel (Ni), copper (Cu), palladium (Pd), gold (Au), or an alloy thereof, but the present invention is not limited thereto.

Referring to FIG. 3, the active layer 115 may include a first block in which a first region I formed to one side based on a central portion R of the ceramic body 110 in the length direction in the length-width (L-W) cross-section of the ceramic body 110 and including internal electrodes having different polarities facing one another in a lamination direction to form capacitance and a second region II including internal electrodes having the same polarity disposed in the lamination direction so as to not form capacitance, and a second block in which a third region III formed on the other side based on the central portion R of the ceramic body 110 in the length direction, facing the first region I in the length direction of the ceramic body 110, and including internal electrodes having the same polarity facing one another in the lamination direction so as to not form capacitance, and a fourth region IV facing the second region II in the length direction of the ceramic body 110 and including internal electrodes having different polarities facing one another in the lamination direction to form capacitance.

According to an embodiment of the present invention, in the central portion R of the ceramic body 110 in the length direction, internal electrodes having different polarities may face one another in the lamination direction to form capacitance, but the present invention is not limited thereto.

A plurality of first blocks and a plurality of second blocks may be alternately laminated, but the present invention is not limited thereto.

In the first block, the first region I formed to one side based on the central portion R of the ceramic body 110 in the length direction in the length-width (L-W) cross-section of the ceramic body 110 and including internal electrodes having different polarities facing one another in a lamination direction to form capacitance and the second region II including internal electrodes having the same polarity disposed in the lamination direction so as to not form capacitance may be disposed in the lamination direction.

The first region I in which internal electrodes having different polarities face one another in the lamination direction may be referred to as a region in which the first and second internal electrodes 121 and 122 are alternately laminated to form capacitance.

The second region II in which internal electrodes having the same polarity face one another in the lamination direction may be referred to as a region in which the first internal electrodes 121 or the second internal electrodes 122 are laminated in a facing manner so as to not form capacitance.

In this manner, the first region I and the second region II are disposed in the lamination direction, and the third region III formed in the other side based on the central portion R of the ceramic body 110 in the length direction, facing the first region I in the length direction of the ceramic body 110, and including internal electrodes having the same polarity facing one another in the lamination direction so as to not form capacitance, and the fourth region IV facing the second region II in the length direction of the ceramic body 110 and including internal electrodes having different polarities facing one another in the lamination direction to form capacitance are disposed in the lamination direction, obtaining an excellent effect of reducing acoustic noise when the MLCC 100 is mounted on a printed circuit board (PCB).

Namely, since the first and second blocks are disposed on both sides of the ceramic body 110 based on the central portion R of the ceramic body 110 in the length direction in which the internal electrodes having different polarities face one another in the lamination direction to form capacitance, overlap regions may be dispersed, obtaining an effect of reducing acoustic noise when the MLCC is mounted on a PCB.

The effect of reducing acoustic noise when the MLCC is mounted on a PCB by dispersing the overlap regions of the internal electrodes will be described in more detail.

When different voltages having different polarities are applied to the first and second external electrodes 131 and 132 formed on both end portions of the MLCC 100, an overlap region in which the internal electrodes overlap and a non-overlap region in which the internal electrodes do not overlap show different aspects of contraction and expansion.

Namely, in the overlap region in which the internal electrodes overlap, the internal electrodes expand in the thickness direction of the ceramic body 110, and the internal electrodes in the non-overlap region contract.

Thus, according to an embodiment of the present invention, expansion takes place in the first region I and the fourth region IV as regions in which the internal electrodes overlap and contraction takes place in the second region II and the third region III as regions in which the internal electrodes does not overlap.

In this case, regions of the first and second external electrodes 131 and 132 corresponding to the first region I and the fourth region IV in the length direction of the ceramic body 110 in which expansion takes place, contract in an inward direction of the ceramic body 110.

Also, regions of the first and second external electrodes 131 and 132 corresponding to the second region II and the third region III in the length direction of the ceramic body 110 in which contraction takes place, expands in an outward direction of the ceramic body 110.

Referring to FIG. 3, as a result, contraction and expansion alternately take place in respective regions of the first and second external electrodes 131 and 132 in the width direction of the ceramic body 110.

Due to the contraction and expansion of the regions of the first and second external electrodes 131 and 132, an influence of acoustic noise that may be generated when the MLCC is mounted on a PCB can be minimized.

Meanwhile, referring to FIG. 3, as for the corresponding regions of the first and second external electrodes 131 and 132 in the length direction of the ceramic body 110, when the first external electrode 131 expands, the second external electrode 132 contracts, and when the first external electrode 131 contracts, the second external electrode 132 expands.

As a result, when the MLCC is mounted on a PCB, since the corresponding regions of the first and second external electrodes 131 and 132 expand and contract complementarily in the length direction of the ceramic body 110, influences of expansion and contraction of the first and second external electrodes that may generate acoustic noise are canceled out, thus reducing acoustic noise.

Hereinafter, a relationship between constituent elements included in the MLCC according to the present embodiment and acoustic noise will be described.

Referring to FIG. 4, it is defined that half of the overall thickness of the ceramic body 110 is A, a thickness of the lower cover layer 113 is B, half of overall thickness of the active layer 115 is C, a thickness of the upper cover layer 112 is D, and a thickness of a portion without a dummy electrode 123 in the upper cover layer 112 is E.

Here, the overall thickness of the ceramic body 110 refers to a distance from the upper surface $S_T$ of the ceramic body 110 to the lower surface $S_B$ thereof, and the overall thickness of the active layer 115 refers to a distance from an upper surface of the first internal electrode 121 formed upwardly of the active layer 115 to a lower surface of the second internal electrode 122 formed on the lowermost portion of the active layer 115.

Also, the thickness B of the lower cover layer 113 refers to a distance from the lower surface of the second internal electrode 122 formed on the lowermost portion of the active layer 115 in the thickness direction to the lower surface $S_B$ of the ceramic body 110, and the thickness D of the upper cover layer 112 refers to a distance from the upper surface of the first internal electrode 121 formed upwardly of the active layer 115 in the thickness direction to the upper surface $S_T$ of the ceramic body 110.

When voltages having different polarities are applied to the first and second external electrodes 131 and 132 formed on both end portions of the MLCC 100, the ceramic body 110 expands and contracts in the thickness direction due to inverse piezoelectric effect of the dielectric layers 111, while the both end portions of the first and second external electrodes 131 and 132 contract and expand due to the Poisson effect, contrary to the expansion and contraction of the ceramic body 110 in the thickness direction.

Here, the central portion of the active layer 115 is a portion which is maximally expanded and contracted in both end portions of the ceramic body 110 in the length direction of the first and second external electrodes 131 and 132, which causes acoustic noise.

Namely, in the present embodiment, in order to reduce acoustic noise, due to a difference between strain generated in the central portion $CL_A$ of the active layer 150 and that generated in the lower cover layer 113 during the application of voltage, a point of inflection (PI) may be formed in both end portions of the ceramic body 110 below the central portion $CL_C$ of the ceramic body 110 in the thickness direction.

Here, in order to further reduce acoustic noise, preferably, the ratio ((B+C):A) by which the central portion $CL_A$ of the active layer 115 deviates from the central portion of the ceramic body 110 satisfies the range 1.063≤(B+C)/A≤1.745.

Also, the ratio (B:A) (or B/A) between half (A) of the thickness D of the ceramic body 110 and the thickness B of the lower cover layer 113 may satisfy the range 0.329≤B/A≤1.522.

Also, the ratio (C:B) between the thickness B of the lower cover layer 113 and the half (C) of the thickness of the active layer 115 may satisfy the range 0.146≤C/B≤2.458.

Experimental Example

Multilayer ceramic capacitors (MLCC) according to embodiments of the present invention and comparative examples were fabricated as follows.

The MLCCs according to the Examples were manufactured through the following steps.

First, slurry including powder formed of a material such as barium titanate ($BaTiO_3$), or the like, was applied to a carrier film and then dried to prepare a plurality of ceramic green sheets having a thickness of 1.8 μm.

Next, internal electrodes were formed by applying a conductive paste for a nickel internal electrode on the ceramic green sheets by using a screen.

About three hundreds and seventy (370) ceramic green sheets were laminated, and here, a larger number of ceramic green sheets without an internal electrode were laminated below ceramic green sheets with an internal electrode formed thereon than those above the ceramic green sheets with an internal electrode formed thereon. The laminate (or lamination body) was isostatically-pressed under pressure conditions of 1000 kgf/cm$^2$ at 85° C. The pressing-completed ceramic laminate was severed into individual chips, and a debinding process was performed by maintaining the individual chips at 230° C. for 60 hours under an air atmosphere.

Thereafter, the chips were fired at an oxygen partial pressure of $10^{-11}$ atm ~ $10^{-10}$ atm, lower than a Ni/NiO equilibrium oxygen partial pressure, under a reduced atmosphere such that the internal electrodes were not oxidized. After the firing operation, a chip size (length×width (L×W)) of a laminated chip capacitor was 1.64 mm×0.88 mm (L×W, 1608 size). Here, a fabrication tolerance was determined to be ±0.1 mm in length×width, and acoustic noise of a chip satisfying the fabrication tolerance was measured in the experimentation.

Thereafter, the chip was subjected to processes such as an external electrode formation process, a plating process, and the like, to fabricate an MLCC.

TABLE 1

| sample | A (μm) | B (μm) | C (μm) | D (μm) | (B + C)/A | B/A | D/B | C/B | AN (dB) | Capacitance implementation rate |
|---|---|---|---|---|---|---|---|---|---|---|
| 1* | 405.5 | 40.2 | 365.4 | 39.9 | 1.000 | 0.099 | 0.993 | 9.090 | 29.5 | OK |
| 2* | 436.0 | 70.4 | 365.9 | 69.7 | 1.001 | 1.161 | 0.990 | 5.197 | 25.7 | OK |
| 3* | 455.5 | 90.8 | 364.3 | 91.5 | 0.999 | 0.199 | 1.008 | 4.012 | 23.1 | OK |
| 4* | 508.1 | 24.9 | 361.1 | 269.1 | 0.760 | 0.049 | 10.807 | 14.502 | 31.2 | OK |
| 5* | 456.6 | 25.2 | 360.1 | 167.8 | 0.844 | 0.055 | 6.659 | 14.290 | 32.5 | OK |
| 6* | 527.3 | 30.2 | 191.0 | 642.4 | 0.419 | 0.057 | 21.272 | 6.325 | 30.3 | OK |
| 7* | 414.5 | 30.9 | 188.8 | 420.4 | 0.530 | 0.075 | 13.605 | 6.110 | 30.5 | OK |
| 8* | 516.2 | 39.4 | 360.7 | 271.5 | 0.775 | 0.076 | 6.891 | 9.155 | 28.2 | OK |
| 9* | 446.0 | 39.8 | 365.5 | 121.2 | 0.909 | 0.089 | 3.045 | 9.183 | 29.1 | OK |
| 10* | 469.1 | 40.6 | 364.2 | 169.1 | 0.863 | 0.087 | 4.165 | 8.970 | 27.9 | OK |
| 11* | 416.2 | 40.7 | 360.7 | 70.3 | 0.964 | 0.098 | 1.727 | 8.862 | 28.4 | OK |
| 12* | 428.3 | 40.8 | 360.0 | 95.7 | 0.936 | 0.095 | 2.346 | 8.824 | 28.9 | OK |
| 13* | 495.9 | 40.9 | 364.9 | 221.0 | 0.818 | 0.082 | 5.403 | 8.922 | 28.1 | OK |
| 14* | 435.9 | 25.0 | 421.3 | 4.2 | 1.024 | 0.057 | 0.168 | 16.852 | 31.6 | OK |
| 15* | 420.7 | 70.4 | 365.9 | 39.1 | 1.037 | 0.167 | 0.555 | 5.197 | 25.7 | OK |
| 16 | 431.7 | 94.8 | 364.3 | 40.0 | 1.063 | 0.220 | 0.422 | 3.843 | 19.9 | OK |
| 17 | 443.0 | 103.8 | 389.1 | 4.0 | 1.113 | 0.234 | 0.039 | 3.749 | 19.3 | OK |
| 18 | 443.7 | 119.8 | 363.2 | 41.1 | 1.089 | 0.270 | 0.343 | 3.032 | 18.7 | OK |
| 19 | 447.1 | 147.3 | 362.1 | 22.7 | 1.139 | 0.329 | 0.154 | 2.458 | 17.9 | OK |
| 20 | 452.8 | 164.7 | 360.2 | 20.4 | 1.159 | 0.364 | 0.124 | 2.187 | 17.3 | OK |
| 21 | 448.7 | 170.3 | 361.0 | 5.1 | 1.184 | 0.380 | 0.030 | 2.120 | 17.2 | OK |
| 22 | 470.7 | 170.3 | 365.4 | 40.2 | 1.138 | 0.362 | 0.236 | 2.144 | 17.4 | OK |
| 23 | 491.9 | 220.3 | 360.8 | 41.8 | 1.181 | 0.448 | 0.190 | 1.638 | 16.9 | OK |
| 24 | 500.6 | 270.2 | 360.5 | 9.9 | 1.260 | 0.540 | 0.037 | 1.334 | 16.8 | OK |
| 25 | 516.9 | 270.4 | 361.8 | 39.7 | 1.223 | 0.523 | 0.147 | 1.338 | 16.7 | OK |
| 26 | 502.1 | 364.9 | 312.3 | 14.7 | 1.349 | 0.727 | 0.040 | 0.856 | 16.6 | OK |
| 27 | 407.5 | 421.8 | 189.1 | 14.9 | 1.499 | 1.035 | 0.035 | 0.448 | 16.6 | OK |
| 28 | 445.8 | 493.3 | 179.3 | 39.7 | 1.509 | 1.107 | 0.080 | 0.363 | 16.5 | OK |
| 29 | 483.7 | 632.0 | 160.1 | 15.2 | 1.638 | 1.307 | 0.024 | 0.253 | 16.4 | OK |
| 30 | 520.0 | 643.4 | 190.7 | 15.2 | 1.604 | 1.237 | 0.024 | 0.296 | 16.4 | OK |
| 31 | 486.4 | 685.3 | 121.1 | 45.3 | 1.658 | 1.409 | 0.066 | 0.177 | 16.4 | OK |
| 32 | 507.2 | 742.7 | 120.8 | 30.1 | 1.702 | 1.464 | 0.041 | 0.163 | 16.4 | OK |
| 33 | 515.2 | 773.9 | 118.2 | 20.1 | 1.732 | 1.502 | 0.026 | 0.153 | 16.4 | OK |
| 34 | 524.5 | 798.2 | 116.9 | 16.9 | 1.745 | 1.522 | 0.021 | 0.146 | 16.3 | OK |
| 35* | 533.4 | 832.4 | 109.8 | 14.8 | 1.766 | 1.561 | 0.018 | 0.132 | 16.3 | NG |
| 36* | 533.3 | 841.1 | 105.3 | 14.9 | 1.775 | 1.577 | 0.018 | 0.125 | 16.3 | NG |
| 37* | 534.1 | 849.7 | 101.2 | 16.1 | 1.780 | 1.591 | 0.019 | 0.119 | 16.3 | NG |

*indicates comparative example, and
AN is acoustic noise

Data in Table 1 was obtained by measuring dimensions of sections of the central portion of the ceramic body 110 of the MLCC 100 taken in the length direction (L) and the thickness direction (T) from the central portion of the ceramic body 12 in the width (W) direction, based on images taken by a scanning electron microscope (SEM).

Here, as described above, A was defined as half of the overall thickness of the ceramic body 110, B was defined as a thickness of the lower cover layer 113, C was defined as half of the overall thickness of the active layer 115, and D was defined as a thickness of the upper cover layer 112.

In order to measure acoustic noise, a single sample (MLCC) per board for measuring acoustic noise was discriminated in a vertical direction and mounted on a PCB, and then, the board was mounted in a measurement jig.

Thereafter, a DC voltage and varied voltages were applied to both terminals of the sample mounted in the measurement jig by using a power DC power supply and a signal generator (or a function generator). Acoustic noise was measured through a microphone installed directly above the PCB.

In Table 1, samples 1 to 3 are comparative examples having a cover-symmetrical structure in which the thickness B of the lower cover layer 113 and the thickness D of the upper cover layer D were substantially similar, and samples 4 to 13 are comparative examples having a structure in which the thickness D of the upper cover layer 112 was greater than the thickness B of the lower cover layer.

Samples 14, 15, and 35 to 37 are comparative examples having a structure in which the thickness B of the lower cover layer 113 was greater than the thickness D of the upper cover layer 112, and samples 16 to 34 were embodiments of the present invention.

Here, when (B+C)/A was nearly 1, it means that the central portion of the active layer 115 does not greatly deviate from the central portion of the ceramic body 110. The (B+C)/A value of samples 1 to 3 having a cover-symmetrical structure in which the thickness B of the lower cover layer 113 and the thickness D of the upper cover layer 112 were substantially similar is nearly 1.

When (B+C)/A was greater than 1, the central portion of the active layer 115 deviated from the central portion of the ceramic body 110 in an upward direction, and when (B+C)/A was smaller than 1, the central portion of the active layer 115 deviated from the central portion of the ceramic body 110 in a downward direction.

Referring to Table 1, it can be seen that, in samples 16 to 34 in which the ratio (B+C)/A by which the central portion of the active layer 115 deviated from the central portion of the ceramic body 110 satisfied the range $1.063 \leq (B+C)/A \leq 1.745$, acoustic noise was significantly reduced to less than 20 dB.

Also, samples 1 to 15 in which the ratio (B+C)/A by which the central portion of the active layer 115 deviated from the central portion of the ceramic body 110 was less than 1.063, had a structure in which the central portion of the active layer 115 scarcely deviated from the central portion of the ceramic body 110 or the central portion of the active layer 115 deviated from the central portion of the ceramic body 110 in a downward direction.

Samples 1 to 15 having (B+C)/A less than 1.063 have acoustic noise ranging from 25 dB to 32.5 dB, so it can be seen that samples 1 to 15 did not have an acoustic noise reduction effect in comparison to the embodiment of the present invention.

Also, in the case of samples 35 to 37 in which the ratio (B+C)/A by which the central portion of the active layer 115 deviated from the central portion of the ceramic body 110 exceeds 1.745, capacitance was lower than a target value, causing defective capacitance.

In Table 1, capacitance implementation rate (i.e., a ratio of capacitance to target capacitance value) indicated as 'NG' means that when a target capacitance value is 100%, a capacitance value against the target capacitance value is less than 80%.

Also, it can be seen that embodiments in which the ratio (D:B) between the thickness D of the upper cover layer 112 and the thickness B of the lower cover layer 113 satisfied the range $0.021 \leq D/B \leq 0.422$ had considerably reduced acoustic noise.

Meanwhile, it can be seen that comparative examples in which the ratio (D:B) between the thickness D of the upper cover 112 and the thickness B of the lower cover layer 113 exceeded 0.422 had no effect of reducing acoustic noise.

If the ratio (D:B) between the thickness D of the upper cover layer 112 and the thickness B of the lower cover layer 113 is less than 0.021, the thickness B of the lower cover layer 113 is excessively great relative to the thickness D of the upper cover layer 112, potentially generating cracks and delamination and defective capacitance due to low capacitance in comparison to a target capacitance.

Among the embodiments, it can be seen that, in the samples 19 to 34 in which the ratio (B/A) of the thickness B of the lower cover layer 113 to the thickness A of the ceramic body 110 and the ratio (C/B) of the thickness C of the active layer 115 to the thickness B of the lower cover layer 113 satisfied the ranges of $0.329 \leq B/A \leq 1.522$ and $0.146 \leq C/B \leq 2.458$, respectively, acoustic noise was further reduced to less than 18 dB.

Meanwhile, it can be seen that, in the samples 35 to 37 in which the ratio (B/A) of the thickness B of the lower cover layer 113 to the thickness A of the ceramic body 110 exceeded 1.522 or the ratio (C/B) of the thickness C of the active layer 115 to the thickness B of the lower cover layer 113 was less than 0.146, capacitance in comparison to the target capacitance was so low as to generate defective capacitance.

Board for Mounting MLCC

Figure 5:
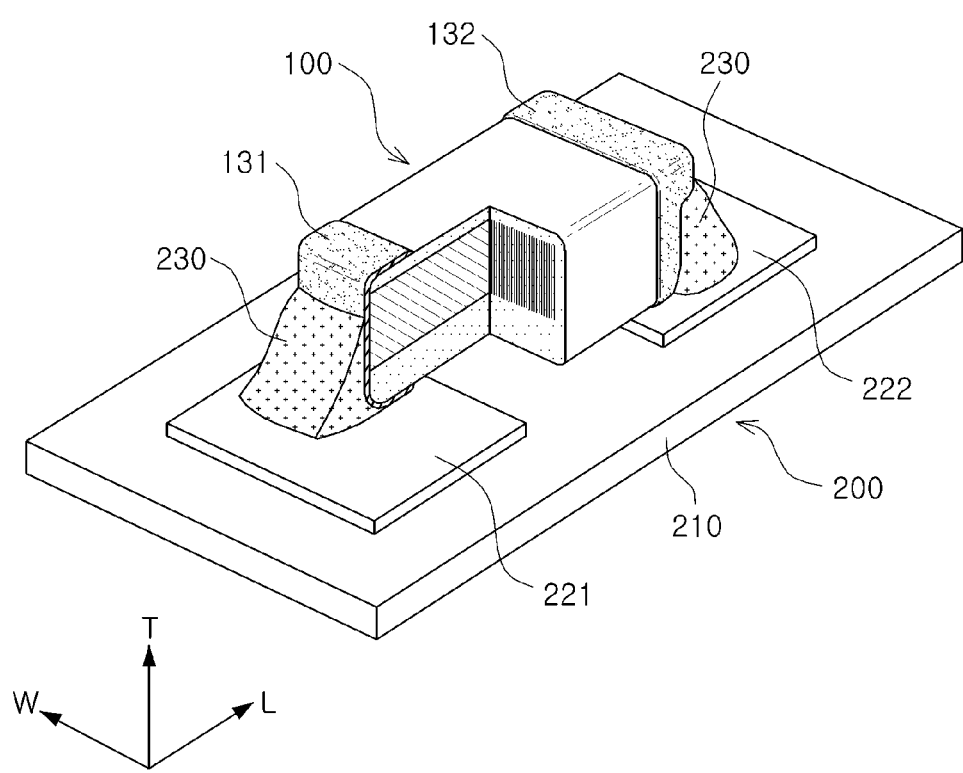
FIG. 5 is a perspective view illustrating the MLCC of FIG. 1 mounted on a printed circuit board (PCB)
Figure 6:
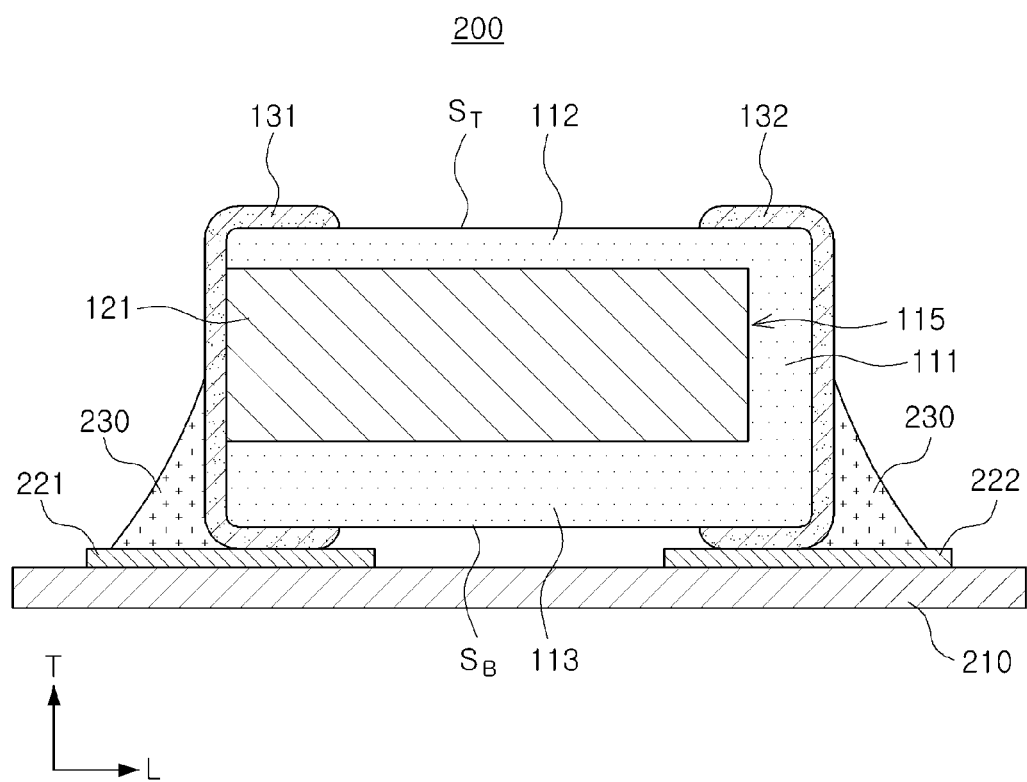
FIG. 6 is a cross-sectional view of the MLCC and PCB of FIG. 5 taken in the length direction.

Referring to FIGS. 5 and 6, a mounting board 200 of the MLCC 100 according to the present embodiment may include a PCB 210 on which the MLCC 10 is horizontally mounted and first and second electrode pads 221 and 222 formed to be spaced apart from one another on an upper surface of the PCB 210.

Here, in a state that the lower cover layer 113 of the MLCC 100 is disposed at the bottom and the first and second external electrodes 131 and 132 are in contact with the first and second electrode pads 221 and 222 on the first and second electrodes 221 and 222, the MLCC 100 may be electrically connected to the PCB 210 by solders 230.

In the state that the MLCC 100 is mounted on the PCB 210, during the application of voltage, acoustic noise may be generated.

Here, the size of the first and second electrode pads 221 and 222 may be an indicator for determining an amount of the solder 230 connecting the first and second external electrodes 131 and 132 and the first and second electrode pads 221 and 222, and a magnitude of acoustic noise may be regulated according to an amount of the solder 230.

Figure 7:
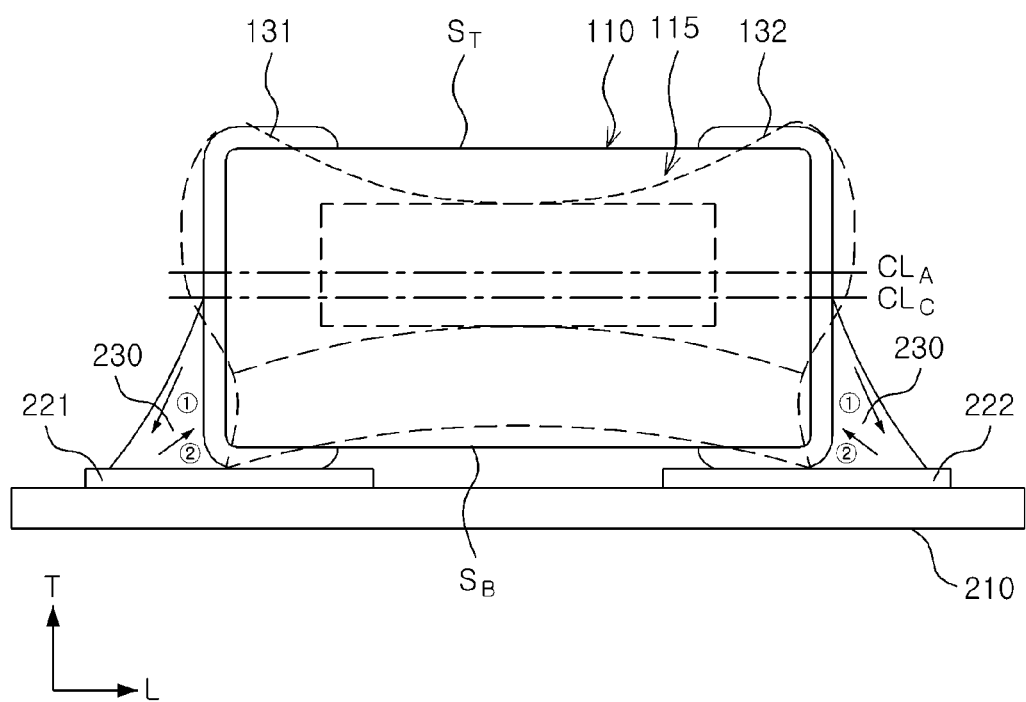
FIG. 7 is a schematic cross-sectional view illustrating the MLCC of FIG. 5 mounted on the PCB, deformed during the application of voltage thereto.

Referring to FIG. 7, with the MLCC 100 mounted on the PCB 210, when voltages having different polarities are applied to the first and second external electrodes 131 and 132 formed on both end portions of the MLCC 100, the ceramic body 110 expands and contracts in the thickness direction due to an inverse piezoelectric effect of the dielectric layers 111, while the both end portions of the first and second external electrodes 131 and 132 contract and expand due to a Poisson effect, contrary to the expansion and contraction of the ceramic body 110 in the thickness direction.

Here, the central portion of the active layer 115 is a portion maximally expanded and contracted in both end portions of the first and second external electrodes 131 and 132 in the length direction, causing acoustic noise.

When both end portions of the MLCC 100 in the length direction are maximally expanded, force exerted on upper portions of the solder 230 outwardly due to expansion is generated, and contracting force thrusting the external electrodes is generated in the lower portions of the solder 230 by the force exerted to the outside.

Thus, as in the present embodiment, when the point of inflection (PI) formed in both end portions of the ceramic body is formed to be lower than the height of the soldering due to a difference between strain generated in the central portion $CL_A$ of the active layer 115 and that generated in the lower cover layer 113 during the application of voltage, acoustic noise can be further reduced.

As set forth above, according to embodiments of the present invention, vibrations generated in the MLCC are reduced, and thus, when the MLCC is mounted on a PCB, acoustic noise can be reduced.

Also, according to an embodiment of the present invention, the internal electrodes are formed in a vertical direction with respect to a PCB in an MLCC, and in particular, the internal electrodes are laminated such that a capacitance formation part and a non-capacitance formation part are disposed to face one another in a length-width direction of the ceramic body, thus obtaining excellent acoustic noise reducing effect.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body in which a plurality of dielectric layers are laminated;
   an active layer including a plurality of first and second internal electrodes formed to be alternately exposed to both end surfaces of the ceramic body with the dielectric layer interposed therebetween, disposed vertically on upper and lower surfaces of the ceramic body and forming capacitance;
   an upper cover layer formed upwardly of the active layer, disposed vertically on the first and second internal electrodes;
   a lower cover layer formed downwardly of the active layer, disposed vertically below the first and second internal electrodes and having a thickness greater than that of the upper cover layer; and
   first and second external electrodes covering both end surfaces of the ceramic body,
   wherein the active layer includes a first block in which a first region I formed to one side based on a central portion R of the ceramic body in the length direction in the length-width (L-W) cross-section of the ceramic body and including internal electrodes having different polarities facing one another in a lamination direction to form capacitance and a second region II including internal electrodes having the same polarity disposed in the lamination direction so as to not form capacitance, and a second block in which a third region III formed on the other side based on the central portion R of the ceramic body in the length direction, facing the first region I in the length direction of the ceramic body, and including internal electrodes having the same polarity facing one another in the lamination direction so as to not form capacitance, and a fourth region IV facing the second region II in the length direction of the ceramic body and including internal electrodes having different polarities facing one another in the lamination direction to form capacitance, and
   wherein the central portion R of the ceramic body in the length direction contains some of the plurality of first and second internal electrodes forming capacitance, and the lengths of the first and second internal electrodes in the central portion R are identical to each other.

2. The multilayer ceramic capacitor of claim 1, wherein in the central portion R of the ceramic body in the length direction, internal electrodes having different polarities face one another in the lamination direction to form capacitance.

3. The multilayer ceramic capacitor of claim 1, wherein a plurality of first blocks and a plurality of second blocks are alternately laminated.

4. The multilayer ceramic capacitor of claim 1, wherein when it is defined that half of the overall thickness of the ceramic body is A, a thickness of the lower cover layer is B, half of overall thickness of the active layer is C, a thickness of the upper cover layer is D, (B+C)/A satisfies $1.063 \leq (B+C)/A \leq 1.745$.

5. The multilayer ceramic capacitor of claim 1, wherein when it is defined that the thickness of the lower cover layer is B and the thickness of the upper cover layer is D, a ratio (D/B or D:B) between the thickness D of the upper cover layer and the thickness B of the lower cover layer satisfies a range of $0.021 \leq D/B \leq 0.422$.

6. The multilayer ceramic capacitor of claim 1, wherein when it is defined that half of the overall thickness of the ceramic body is A and the thickness of the lower cover layer is B, a ratio (B/A) of the thickness B of the lower cover layer to half A of the thickness of the ceramic body satisfies a range of $0.329 \leq B/A \leq 1.522$.

7. The multilayer ceramic capacitor of claim 1, wherein when it is defined that the thickness of the lower cover layer is B and half of the overall thickness of the active layer is C, a ratio (C/B) of the half C of the thickness of the active layer to the thickness B of the lower cover layer satisfies a range of $0.146 \leq C/B \leq 2.458$.

8. The multilayer ceramic capacitor of claim 1, wherein due to a difference between strain generated in the central portion of the active layer and that generated in the lower cover layer during the application of voltage, a point of inflection (PI) formed in both end portions of the ceramic body is formed below the central portion of the ceramic body in the thickness direction.

9. A board for allowing a multilayer ceramic capacitor (MLCC) to be mounted thereon, the board comprising:
   a printed circuit board having first and second electrode pads formed upwardly thereof; and
   an MLCC installed on the PCB,
   wherein the MLCC comprises a ceramic body in which a plurality of dielectric layers are laminated, an active layer including a plurality of first and second internal electrodes formed to be alternately exposed to both end surfaces of the ceramic body with the dielectric layer interposed therebetween, disposed vertically on upper and lower surfaces of the ceramic body and forming capacitance, an upper cover layer formed upwardly of the active layer, disposed vertically on the first and second internal electrodes, a lower cover layer formed downwardly of the active layer, disposed vertically below the first and second internal electrodes and having a thickness greater than that of the upper cover layer, and first and second external electrodes formed on both end surfaces of the ceramic body and connected to the first and second electrode pads by solders, wherein the active layer includes a first block in which a first region I formed to one side based on a central portion R of the ceramic body in the length direction in the length-width (L-W) cross-section of the ceramic body and including internal electrodes having different polarities facing one another in a lamination direction to form capacitance and a second region II including internal electrodes having the same polarity disposed in the lamination direction so as to not form capacitance, and a second block in which a third region III formed on the other side based on the central portion R of the ceramic body in the length direction, facing the first region I in the length direction of the ceramic body, and including internal electrodes having the same polarity facing one another in the lamination direction so as to not form capacitance, and a fourth region IV facing the second region II in the length direction of the ceramic body and including internal electrodes having different polarities facing one another in the lamination direction to form capacitance, and wherein the central portion R of the ceramic body in the length direction contains some of the plurality of first and second internal electrodes forming capacitance, and the lengths of the first and second internal electrodes in the central portion R are identical to each other.

10. The board of claim 9, wherein in the central portion R of the ceramic body in the length direction, internal electrodes having different polarities face one another in the lamination direction to form capacitance.

11. The board of claim 9, wherein a plurality of first blocks and a plurality of second blocks are alternately laminated.

12. The board of claim 9, wherein when it is defined that half of the overall thickness of the ceramic body is A, a thickness of the lower cover layer is B, half of overall thickness of the active layer is C, a thickness of the upper cover layer is D, (B+C)/A satisfies $1.063 \leq (B+C)/A \leq 1.745$.

13. The board of claim 9, wherein when it is defined that the thickness of the lower cover layer is B and the thickness of the upper cover layer is D, a ratio (D/B or D:B) between the thickness D of the upper cover layer and the thickness B of the lower cover layer satisfies a range of $0.021 \leq D/B \leq 0.422$.

14. The board of claim 9, wherein when it is defined that half of the overall thickness of the ceramic body is A and the thickness of the lower cover layer is B, a ratio (B/A) of the thickness B of the lower cover layer to half A of the thickness of the ceramic body satisfies a range of $0.329 \leq B/A \leq 1.522$.

15. The board of claim 9, wherein when it is defined that the thickness of the lower cover layer is B and half of the overall thickness of the active layer is C, a ratio (C/B) of the half C of the thickness of the active layer to the thickness B of the lower cover layer satisfies a range of $0.146 \leq C/B \leq 2.458$.

16. The board of claim 9, wherein due to a difference between strain generated in the central portion of the active layer and that generated in the lower cover layer during the application of voltage, a point of inflection (PI) formed in both end portions of the ceramic body is formed below the central portion of the ceramic body in the thickness direction.

* * * * *